United States Patent [19]

Kramer et al.

[11] Patent Number: 4,917,443
[45] Date of Patent: Apr. 17, 1990

[54] ANTILOCK BRAKE CONTROLLER WITH FAIL-SAFE MICROPROCESSOR

[75] Inventors: Dennis A. Kramer, Troy; Alan E. Tousignant, Mt. Clemens; Robert S. Turner, Royal Oak, all of Mich.

[73] Assignee: Rockwell International Corporation, Pittsburgh, Pa.

[21] Appl. No.: 345,252

[22] Filed: May 1, 1989

[51] Int. Cl.$^4$ ................................................ B60T 8/88
[52] U.S. Cl. ........................................ 303/92; 303/100
[58] Field of Search ........................... 303/92, 91, 100; 364/426.02, 426.03, 426.01, 550; 73/121; 188/181

[56] References Cited

U.S. PATENT DOCUMENTS

| | | | |
|---|---|---|---|
| 3,891,279 | 6/1975 | Frait | 303/92 |
| 4,700,304 | 10/1987 | Byrne et al. | 303/92 X |
| 4,709,341 | 11/1987 | Matsuda | 303/92 X |
| 4,745,542 | 5/1988 | Baba et al. | 303/92 X |

Primary Examiner—Douglas C. Butler

[57] ABSTRACT

A vehicle anti-lock brake system having a main microprocessor and a fail-safe microprocessor of a different type from the main microprocessor, and a device interconnecting the main and fail-safe microprocessors and the remainder of the vehicle braking system so that the fail-safe microprocessor can disable the brake release system independently of the main microprocessor.

4 Claims, 2 Drawing Sheets

ANTILOCK BRAKE CONTROLLER WITH FAIL-SAFE MICROPROCESSOR

BACKGROUND OF THE INVENTION

1. Field of the Invention

This invention relates to an electronically controlled anti-lock braking system (ABS) for a motor vehicle.

2. Description of Related Art

Electronically controlled ABS systems are known in which a microprocessor is used to control release of the brakes of a motor vehicle in response to a determination by the microprocessor that the brakes have locked or are approaching a locked up condition. When such a determination is made, a signal from the controller typically actuates an electro-magnetic brake release, e.g., a solenoid controlled valve in the brake system.

A determination of wheel locking generally requires measurement of actual wheel speed or deceleration, and a determination that the actual wheel speed or deceleration is respectively lower than or greater than a predetermined wheel speed or deceleration limit indicative of an incipient wheel lock situation. It is also possible to make the determination based on a measurement of actual G-force force and comparison with a wheel-speed derived G-force curve.

Such systems are all subject to the common problems of spurious determinations resulting from controller malfunction, and malfunctions in the electro-magnetic brake release. Improper functioning of the ABS can, of course, lead to disastrous consequences, either from failure to release the brakes when the wheels are locked, or from an unintended brake release when braking is required.

As a result, it has been proposed to provide fail-safe circuits for the main controller, and to provide feedback from the brake release to the controller in order to permit the controller to monitor the brake release. Such proposals have not proven to be adequate, given the life-threatening potential of even one malfunction.

A typical "fail-safe" ABS is shown in U.S. Pat. No. 4,700,304, to Byrne et al. In Byrne et al, an analog fail-safe circuit is provided which includes a fuse in series with the drive circuits of an electro-magnetic brake release. When the fuse is blown, the brake release is prevented from operating.

The central ABS controller is a microprocessor which sends out periodic pulses to the fail-safe circuit which disables the fail-safe means from blowing the fuse. The fail-safe circuit of Byrne et al. cannot act independently of the microprocessor, being completely dependent on proper output by the microprocessor of the periodic pulses. If no pulse is received within a predetermined period of time, the fuse automatically blows, but as long as the pulses are received, the fail-safe means is disabled.

An analog system of the type shown in Byrne et al., in addition to being subject to such microprocessor internal errors as, for example, misreading of a brake-release feedback signal, suffers from an unacceptably slow response time. As a result, it has been proposed to substitute a microprocessor for the conventional analog fail-safe circuit.

An example of a system which uses separate microprocessors for detecting malfunctions is disclosed in U.S. Pat. No. 4,709,341 to Matsuda. In Matsuda, identical microprocessors are provided which monitor each other in addition to performing as ABS controllers for respective wheels of the motor vehicle. Dee to costs, such a system is suitable only where separate controllers are required, and in addition suffers from the drawback that it is subject to systematic errors from such sources as radio frequency interference and power supply fluctuations which affect all of the identical microprocessors of Matsuda in exactly the same way due to their identical structure and functions.

SUMMARY OF THE INVENTION

It is an object of the invention to overcome the drawbacks of the prior art by providing an ABS fail-safe controller which includes a fail-safe microprocessor independent of the main controller. The fail-safe microprocessor of the subject invention is capable of disabling a brake-release means either upon detection of main controller malfunction or upon detection of brake-release failure.

The fail-safe microprocessor is programmed to read periodic pulses from the main controller, the pulses being indicative of proper main controller operation, and to prevent the brake-release from operating when the pulses are not detected.

Furthermore, even when pulses are detected, indicating proper main controller operation, the fail-safe microprocessor will still disable the brake-release upon detecting, independently of the main microprocessor, that the brake-release is malfunctioning. Separate feedback lines are provided to permit both the main controller and the fail-safe microprocessor to monitor the brake-release.

The fail-safe microprocessor is advantageously a one-bit microprocessor programmed to monitor several different brake-release means without the need for multiple analog fail-safe circuits.

Control of the brake-release means is preferably implemented via a switch in the drive circuit of the brake-release and responsive to pulses output by the one-bit microprocessor, failure of which automatically opens a switch.

An especially advantageous embodiment of the one-bit microprocessor includes a timer for independently monitoring the solenoid on-time of the brake-release, the microprocessor being capable of shutting down the brake-release if the on-time exceeds a predetermined value.

DESCRIPTION OF THE PREFERRED EMBODIMENT

Figure 1:
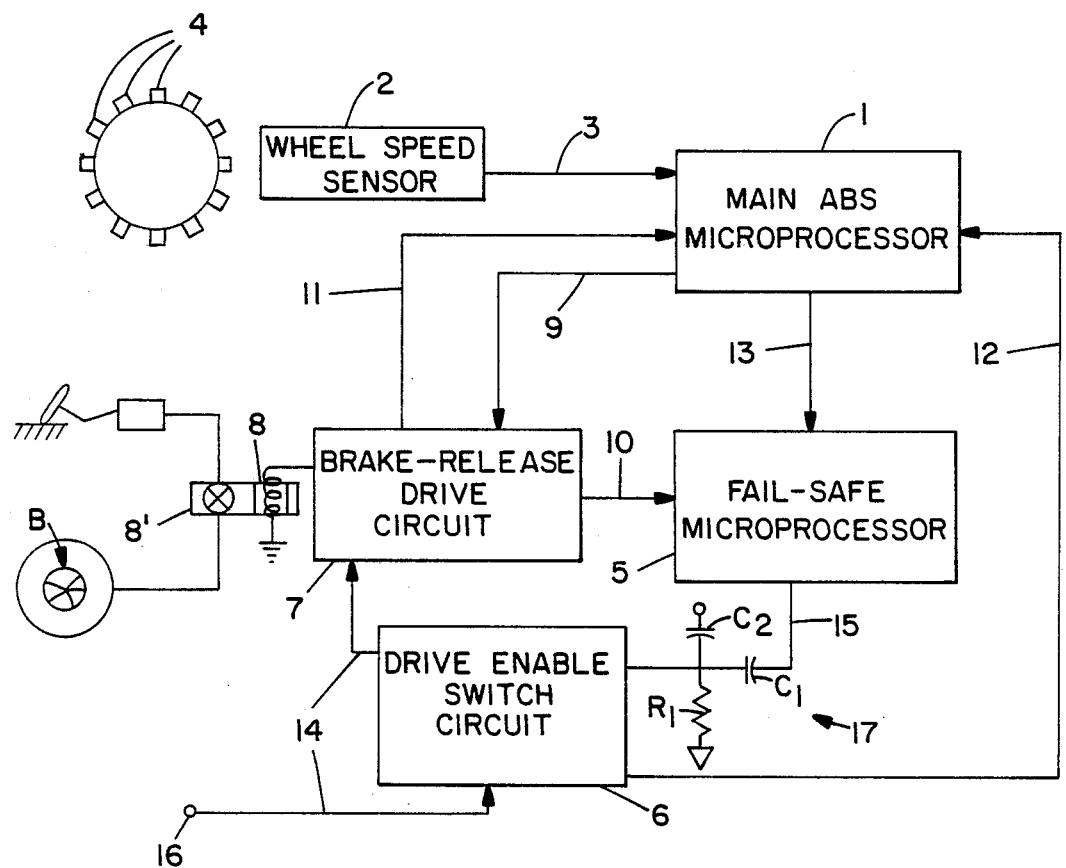
FIG. 1 is a schematic view of a preferred embodiment of the invention.

FIG. 1 shows the main elements of an exemplary ABS fail-safe system according to the present invention. In FIG. 1, controller 1 is a control circuit or control microprocessor for determining an incipient wheel-lock condition in response to an input from wheel speed sensor 2 along line 3.

The wheel speed sensor 2 is responsive to the passage of magnetic elements 4 which rotate with, for example, the differential gearing of a motor vehicle axle (not shown), and thus provides a signal indicative of the speed of the wheel or wheels connected to the axle. An especially advantageous sensor of this type is shown in U.S. Pat. No. 4,724,935 to Roper, incorporated herein by reference, although any sensor arrangement which provides a signal indicative of wheel speed or changes in wheel speed could be used in connection with the preferred embodiment of this invention.

The controller 1 may, for example, be a microprocessor of the type shown in the above-mentioned patent to Roper, incorporated by reference herein, which operates by selecting, according to input from the wheel speed sensor, an appropriate deceleration reference curve. The selected reference curve, when crossed by an actual wheel speed curve, indicate an incipient wheel lock condition, and the controller subsequently provides a signal which causes braking pressure to be reduced, releasing the brakes.

The main controller 1 of the preferred embodiment, however, need not be limited to the particular controller described above. The specifics of incipient wheel lock determination form no part of the instant invention. The preferred fail safe system may be applied to a wide variety of main ABS controllers.

Upon determination of an incipient wheel lock condition, main controller 1 provides a signal along line 9 to brake-release drive circuit 7 which causes drive circuit 7 to actuate solenoid 8, opening a valve 8' for modulating the brakes B of the vehicle (not shown).

In order to ensure that short circuits between the vehicle frame and the solenoid minimally affect the controller, the solenoid is switched on its high voltage side. For example, one side of the solenoid may be pulled high to 12 volts when turned on by the controller. If the high side solenoid lead shorts to the frame, the control system fails safe and does not turn the solenoid on, preventing damage to the controller.

When the main ABS microprocessor 1 is operating properly, it provides a periodic signal along status line 13 to a fail-safe microprocessor 5. The periodic signal may be in the form of a pulse automatically generated once every cycle of a main control loop, or it may be generated, for example, in response to an internal microprocessor diagnostic routine.

Fail-safe microprocessor 5 is for example a one-bit microprocessor different in type from the main microprocessor. This will lessen the probability of systematic errors in both the main microprocessor and the fail-safe microprocessor.

Fail-safe microprocessor 5 outputs a signal along line 15 through AC coupling integrator 17, which enables brake-drive enable switch 6 when no malfunction is detected by the fail-safe microprocessor. The AC coupling may include capacitors $C_1$ and $C_2$, and resistor R, thus serving to integrate a pulsed output on line 15, which can then be level detected by switch 6.

Failure to receive a periodic signal along status line 13 within a predetermined time period is interpreted by fail-safe microprocessor 5 as a malfunction in the main microprocessor 1, and the fail-safe microprocessor consequently ceases to enable brake-drive enable switch 6, causing the brake-release to shut down.

In addition to lines 13 and 15, which respectively serve to carry signals indicative of main controller health and to carry an independently generated fail-safe signal for controlling drive enable switch circuit 6, lines 11, 12, and 10 are provided to provide feedback to the main microprocessor and the fail safe microprocessor regarding operation of drive enable switch circuit 6 and brake-release drive circuit 7.

Feedback lines 11 and 12 are connected, respectively, between main microprocessor 1 and brake release drive circuit 7, and between main microprocessor 1 and drive enable switch circuit 6. Feedback line 10 is connected between a logic input of fail-safe microprocessor 5 and brake release drive circuit 7. In addition, both main microprocessor 1 and fail safe microprocessor 5 are capable of monitoring additional brake-release solenoid drive circuits, e.g., for each axle of a truck.

Figure 2:
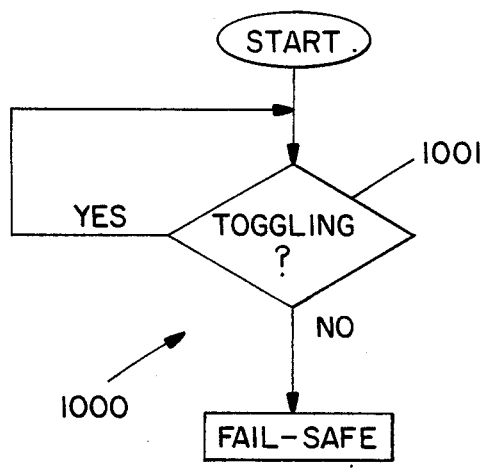
FIGS. 2 and 3 illustrate the operation of the fail-safe microprocessor of the preferred embodiment.
Figure 3:
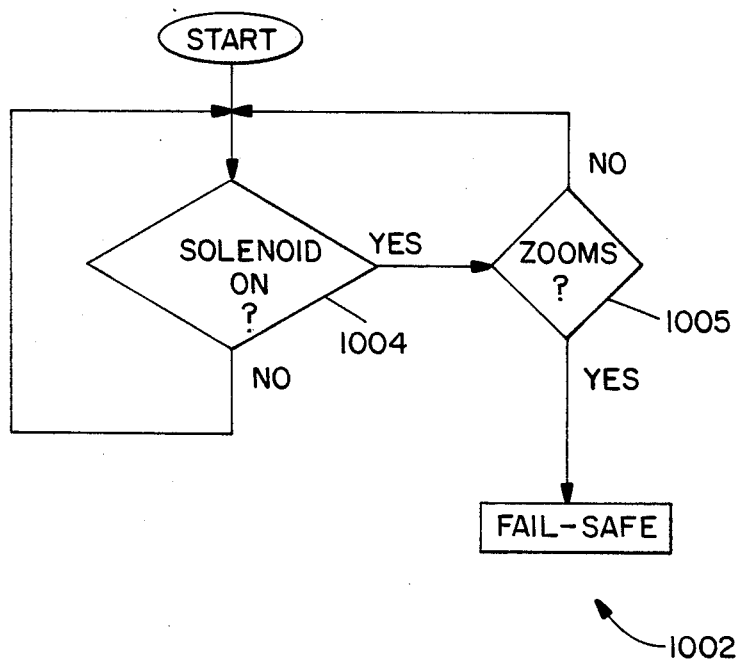

Referring to FIGS. 2 and 3, the one-bit microprocessor performs two primary monitoring functions. The first, indicated by reference numeral 1000, is the main microprocessor monitoring function described above. As indicated by function step 1001, if toggling of status line 13 by the main microprocessor fails, then the fail safe microprocessor disables the drive enable switch circuit.

The second function of the fail-safe microprocessor 5, indicated generally by reference numeral 1002, is to monitor the on-time output of the brake-release drive circuit.

The fail safe microprocessor monitors the on-time of the output of the brake-release drive circuit for a predetermined time interval, e.g., 200 ms, as indicated by steps 1004 and 1005 of the on-time algorithm, shown in FIG. 3. If the solenoid which is connected to the output of the brake release drive circuit is still on after the predetermined time interval, then the fail-safe microprocessor disables the drive enable switch circuit to disable the brake release.

The one-bit microprocessor of the preferred embodiment uses a 200 ms timer because at slow vehicle speeds, under appropriate conditions, the main microprocessor algorithm does not require a longer time, and therefore a solenoid on-time of longer than 200 ms would indicate a malfunction and result in an unnecessarily long and possibly hazardous brake release.

However, under certain circumstances, and especially at higher speeds, longer on-times may be needed. This is accomplished in a very simple manner while maintaining the 200 ms fail-safe capability, by pulsing or turning off the brake-release solenoid for short periods to reset the 200 ms interval timer. Under slippery road conditions at high speeds, the main microprocessor may be programmed to require brake-releases of as long as 3 seconds, in which case the solenoid might, by way of example, be momentarily pulsed off every 60 ms to reset the 200 ms interval timer. Such momentary pulsing would not affect the brake release performance of the solenoid.

Thus, the fail-safe microprocessor of the preferred embodiment is responsive to both failure of the main microprocessor and to malfunctions in the solenoid which are independently detected, to shut down the brake-release function of the anti-lock braking system whenever there is a malfunction that could affect braking performance.

It is to be understood that the invention is not to be restricted to the details of the specific embodiment described, but rather that the scope of the invention should be limited only by the appended claims.

We claim:

1. In an anti-lock brake system for a motor vehicle, said system including means for sensing the rate of rotation of a member whose rate of rotation is indicative of the speed of a wheel of said vehicle; means for generating a wheel speed signal indicative of said rate of rotation; a main control circuit having means for determining an incipient wheel-lock condition based on said wheel speed signal and means for generating a brake release signal upon determining said incipient wheel-lock condition; and means for releasing a brake in response to said brake-force release signal, the improvement comprising:

a main microprocessor;

a fail-safe microprocessor of a different type;

means for connecting said main microprocessor to said brake-release means such that the main microprocessor monitors whether said brake-releasing means has released said brake in response to said brake-force release signal; and means for electrically connecting said fail-safe microprocessor and main microprocessor such that the fail-safe microprocessor monitors said main microprocessor;

said fail-safe microprocessor including means for preventing release of said brake by said brake-release means upon either a determination that said brake-release means is functioning improperly or a determination that said main microprocessor is functioning improperly;

whereby said fail-safe microprocessor is capable of disabling said brake-release system independently of said main microprocessor.

2. The anti-lock brake system of claim 1, wherein said fail safe microprocessor includes a timer for monitoring the on-time of said brake-releasing means, and including means for preventing release of said brake when said on-time exceeds a predetermined on-time limit.

3. The anti-lock brake system of claim 2, wherein said fail-safe microprocessor includes means for resetting said timer by momentarily turning the timer off when said main microprocessor requires that the solenoid on-time (exceed said predetermined on-time limit.

4. The anti-lock brake system of claim 1, wherein said brake-release means includes a valve controlled by a solenoid and arranged to release the brake upon activation of the solenoid.

* * * * *